United States Patent [19]
Kobussen et al.

[11] Patent Number: 6,054,155
[45] Date of Patent: Apr. 25, 2000

[54] BRINE FORMULATION FOR CURING EXTRUDED SAUSAGE STRAND

[75] Inventors: Jaap Kobussen, Veghel, Netherlands; Mart Kobussen; Jos Kobussen, both of Indianola, Iowa; David Alexander, Ames, Iowa

[73] Assignee: Townsend Engineering Company, Des Moines, Iowa

[21] Appl. No.: 08/990,619

[22] Filed: Dec. 15, 1997

[51] Int. Cl.[7] .............................. A23B 4/00; A23L 1/317; A23P 1/12

[52] U.S. Cl. ........................... 426/92; 426/105; 426/140; 426/277; 426/305; 426/513; 426/517

[58] Field of Search ...................... 426/276, 277, 426/302, 305, 89, 92, 105, 140, 513, 517

[56] References Cited

U.S. PATENT DOCUMENTS

| | | | |
|---|---|---|---|
| 3,622,353 | 11/1971 | Bradshaw | 99/169 |
| 3,767,821 | 10/1973 | Deacon | 426/276 |
| 4,052,517 | 10/1977 | Youngquist | 426/302 |
| 5,271,948 | 12/1993 | Boni et al. | 426/278 |

FOREIGN PATENT DOCUMENTS

| | | |
|---|---|---|
| 807863 | 1/1959 | United Kingdom . |
| 1 232 801 | 5/1971 | United Kingdom . |
| 1 288 111 | 9/1972 | United Kingdom . |
| WO 93/12660 | 7/1993 | WIPO . |
| WO 95/28090 | 10/1995 | WIPO . |

*Primary Examiner*—Keith D. Hendricks
*Assistant Examiner*—Drew Bed
*Attorney, Agent, or Firm*—Zarley, McKee, Thomte, Voorhees & Sease

[57] ABSTRACT

A method for coagulating a co-extruded collagen gel on a food product is described wherein a highly dissoluble salt having a dissolubility of at least 8 moles per liter water at 20° C. is applied to the collagen gel whereby the collagen gel is coagulated in less than 60 seconds. The collagen gel is acidified with an inorganic acid such as hydrochloric or sulfuric acid and has a dry matter of between 3 and 255.

13 Claims, 2 Drawing Sheets

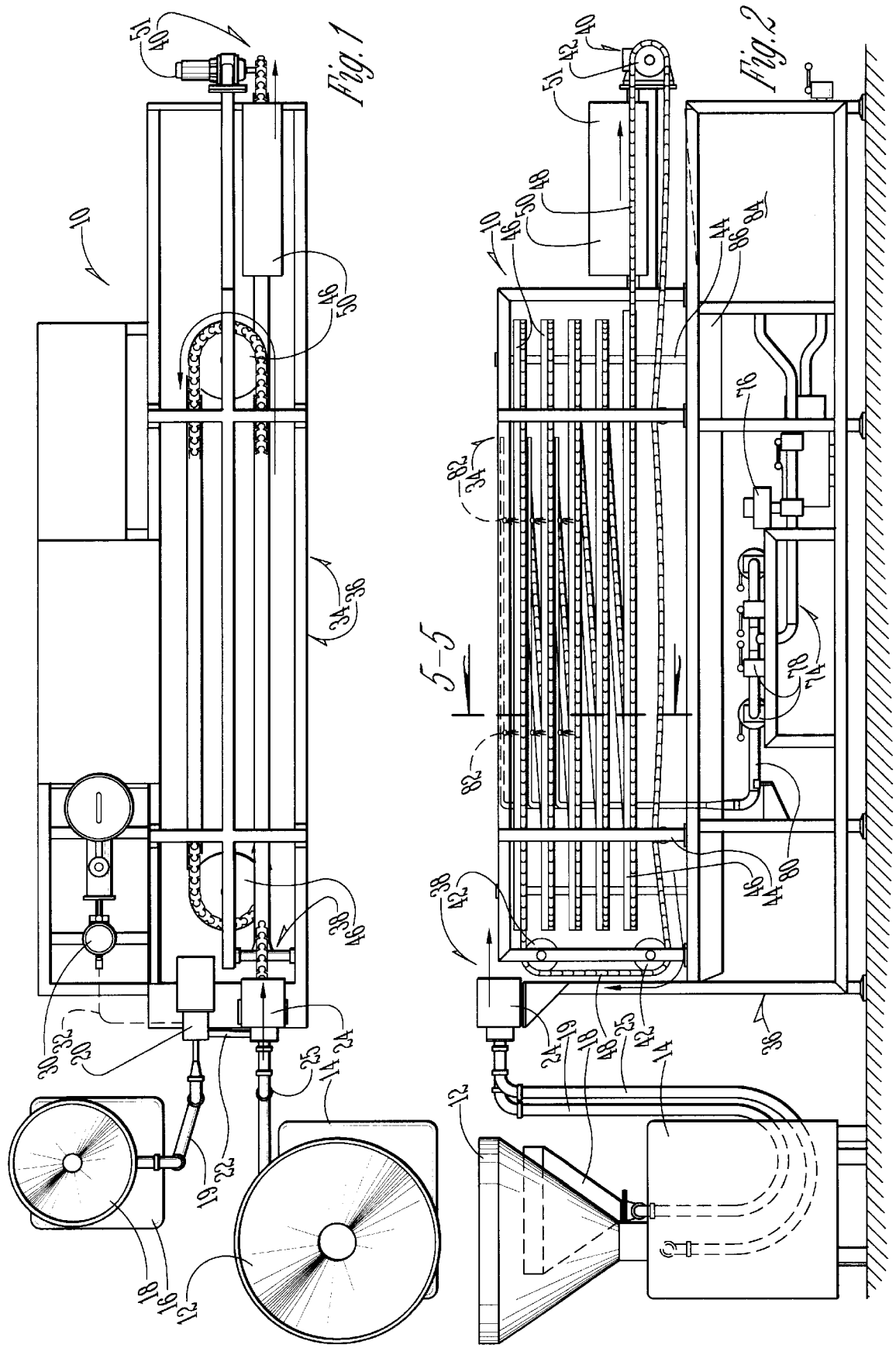

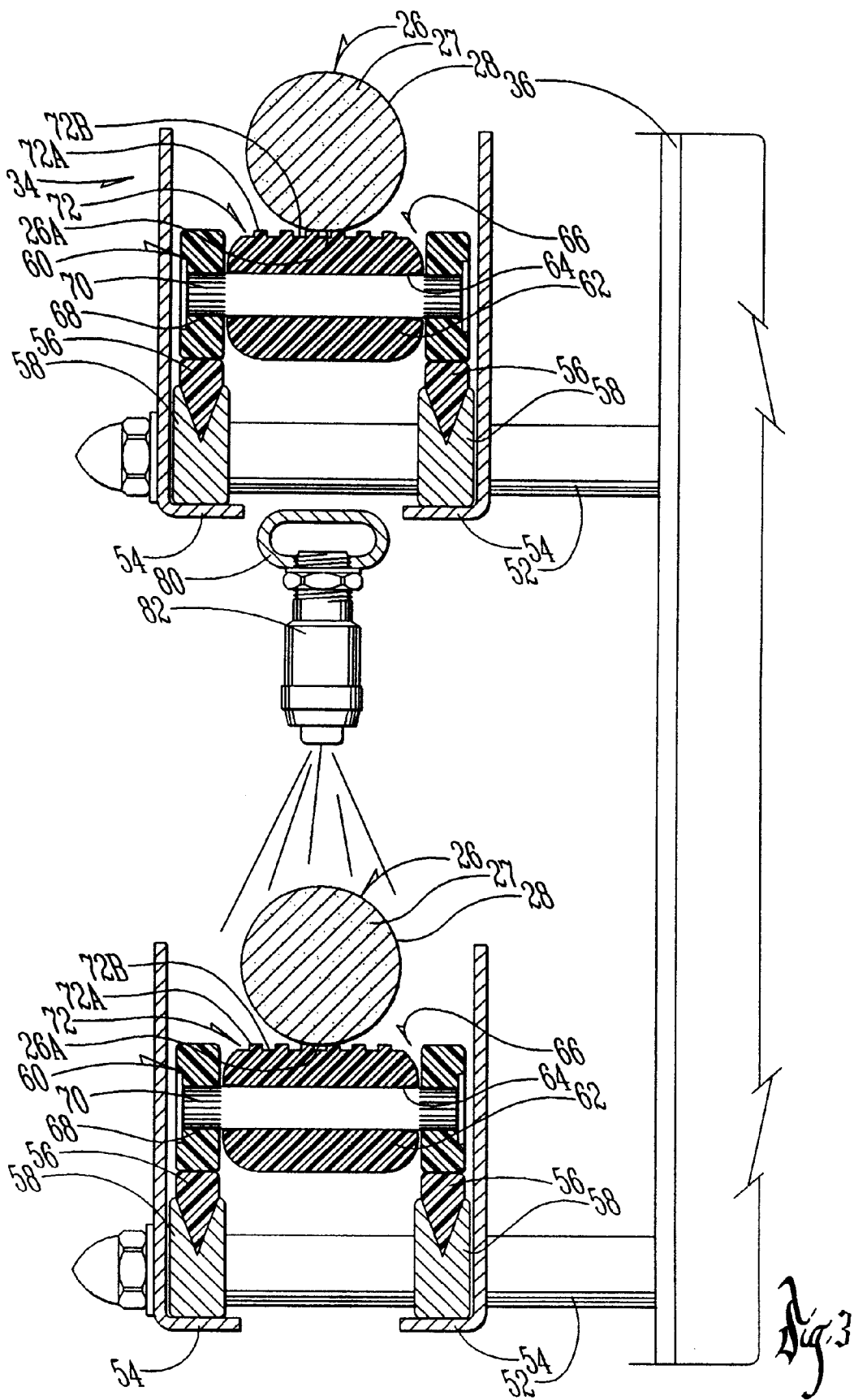

BRINE FORMULATION FOR CURING EXTRUDED SAUSAGE STRAND

BACKGROUND OF THE INVENTION

The present invention relates to the preparation of collagen-coated foodstuffs, especially sausages.

There are two approaches to making sausages. The first is to take natural or artificial sausage casing and stuff it with sausage meat. In recent times, it has become known to coextrude a strand of sausage material which has an inner core of meat emulsion having an outer surface material that can be coagulated to provide an encasement for the strand. The outer surface material may consist of a gel with a collagen protein. The coagulation normally includes subjecting the extruded strand to a brine (salt) solution. The brine is applied immediately after the strand is extruded to coagulate the proteins in the gel.

In the generally known methods, the water content of the gel coating is lowered with the assistance of osmosis by leading the strand of food stuffs through a concentrated salt bath. Thereafter, an air drying step is used to further enhance the strength of the sausage casing. After this treatment, the mechanical properties of the casing are insufficient to allow for conventional twist linking, clipping, or hanging of the foodstuff, i.e. sausage strand. With this usual method, it is habitual to crimp the coextruded strand of foodstuff and cut it into individual elements. These elements are thereafter placed in a hot air dryer for the treatment of individual elements, for example, drying, smoking, etc. This known method has a number of disadvantages. First, sausages manufactured with this coextrusion method tend to have inferior qualities, including inferior color, taste, or appearance in comparison to sausages which have been manufactured with a natural or artificial casing. This is due to long dwelling times of the meat in the brine solution which are necessary for sufficient coagulation of the collagen gel. During this time, the brine solution is absorbed into the meat which can cause an off-taste.

Another disadvantage with the coextrusion process is that standard smoking and/or cooking installations cannot be used economically in the further processing of the meat. The low casing strength, resulting the treatment with brine, requires the use of a smoking and cooking installation where the crimp/cut sausages are transported on a horizontal belt. In standard smoking and cooking installations the sausages strands are hung in loops on sticks and thus processed. Apart from the coextrusion process requiring an investment in new smoking and cooking installations, the processing of sausage flat on a belt gives a different and unwanted appearance from the conventional natural or artificial casesd sausages.

International patent application WO930/12660 to Morgan et al. discloses a coextrusion method intended to solve the aforementioned problems. This method also includes the steps of coextruding a mainly equal layer of collagen gel around an extruded edible product and the subsequent chemical coagulation of the extruded collagen gel while using a chemical coagulation means, though without the step of drying with hot air in order to achieve a coagulated collagen casing around the edible product. Principally this is achieved by prolonging the brine treatment with a more effective brine solution compared to the traditional coextrusion process. In the latter process sodium chloride brine solutions are commonly used. In Morgan et al. the more effective brine solution comprises using other salts which give a higher osmotic drying while reducing the taste and appearance effects which limit the traditional methods. Proposed is the use of Sodium Carbonate. The dissolvability of sodium carbonate and thus osmotic drying strength of the brine is raisec by heating the brine solution. However, this disclosed method also does not adequately resolve the aforementioned problems and disadvantages.

First, the sausages manufactured using the method disclosed by Morgan et al. still do not have sufficient casing strength to allow traditional processing i.e. hanging on sticks. For instance, when strands of edible foodstuffs which are thus manufactured are hung, the partly fluid meat mix flows downward, giving the edible foodstuff an undesirable cone shape. An additional disadvantage is that, due to the lengthy stay in the coagulation bath, the salt content in the casing and in the meat mix, is high. In spite of the type of salts used in the brine this results in unwanted organoleptical and physical changes of the sausage mix, such as in taste, consistency and firmness of the meat mix. Further, the high solvent temperatures necessary to complete the coagulation process tend to discolor the meat, and weaken the casing by protein denaturation.

It is therefore a principal object of the present invention to provide a method for manufacturing coextruded food strands with an edible casing in which the previous problems and disadvantages of the known coextrusion methods do not occur.

It is a further object of the present invention to provide a novel means of coagulating collagen containing gel on a coextruded food product.

It is still a further object of the present invention to provide a method for coagulating collagen containing gel in the coextrusion process which allows for shorter coagulation times.

It is yet a further object of the present invention to provide a means of coagulating collagen containing gel in the coextrusion process which does not negatively influence the organoleptic properties of the foodstuff.

It is yet a further object of the present invention to provide a means of coagulating collagen containing gel in the coextrusion process which eliminates the need for air drying following coagulation.

It is still a further object to the present invention to provide a means of coagulating collagen gel in the coextrusion process which is economical to use.

An additional object of the present invention is to create by co-extrusion a substantially uniform layer of a collagen-containing gel, with a dry matter of between 3 and 25%, around an elongated strand of foodstuff wherein the gel is acidified using an inorganic acid which is set in contact with an aqueous solution containing a highly dissolvable salt.

These and other objects will become clear from the following description of the invention.

SUMMARY OF THE INVENTION

The present invention discloses the use of a highly dissoluble salt for coagulating collagen containing gel surrounding an edible foodstuff in a coextrusion process. Said collagen containing gel having been acidified using an inorganic acid and having a dry matter of between 3 and 25%. The highly dissoluble salt provides for higher osmotic drying of the collagen gel which in turn shortens the coagulation time. This allows for the lowering of the temperature of the coagulation bath or solution. Said highly dissolvable salts are especially effective in producing a high strength collagen casing within a shorter time then until hereto possible when used in combination of a collagen containing gel which has been acidified using an inorganic acid. And being even more effective when used in combination with a gel which has a dry matter of between 3 and 25%. The method also eliminates the need for an air-drying step following coagulation.

The new coextrusion method offers many advantages over conventional coextrusion methods. First, the lowering of the coagulation bath temperature allows the use of ambient temperatures, which do not discolor the meat. Further, the shorter dwelling times reduce the migration of the salt solution into the meat, thus preventing an off-taste. The method also provides cost-savings due to the elimination of the air-drying step and coagulation temperature control, as well as savings on the usage of salt and energy.

Highly dissoluble salts suitable for use in the present invention have a dissolubility at 20° C. of at least 8 moles per liter water. Naturally, the salts used must be food aprpoved. Using this type of salt, the coagulation process is performed in 60 seconds or less. Preferred salts include dipotassium phosphate and potassium carbonate, which are particularly suitable because of their tasteless character and high dissolvability.

The gel surrounding the foodstuff is a substantially uniform layer of a collagen-containing gel around an elongated strand of foodstuff wherein the gel is acidified at least partially using an inorganic acid, and having a dry matter of between 3 and 25%, which is set in contact with an aqueous solution containing a highly dissolvable salt.

DESCRIPTION OF THE DRAWINGS

FIG. 1 is a plan view of a sausage extruder unit and an associated conveyor.

FIG. 2 is a side elevational view thereof as viewed from the bottom of FIG. 1.

FIG. 3 is an enlarged sectional view taken on line 3—3 of FIG. 1.

DETAILED DESCRIPTION OF THE PREFERRED EMBODIMENT

The present invention provides a process and composition for chemically coagulating the coextruded collagen containing gel surrounding an edible food stuffs, i.e., sausages.

Coextrusion methods are mainly being used for the coextrusion of sausage or sausage-like materials. While the instant process relates particularly to the production of sausages, it may also be used in the production of other collagen coated food stuffs such as fish or meat products containing vegetable or cheese or both. Thus, while the description of the process will be in terms of the production of strings of sausages, the process is clearly not limited to that particular food stuff. The term "sausage" as used herein refers to any type of emulsified meat product that is formed into sausage or frankfurter links or the like.

The term "coagulation" is a term of art in the production of collagen coated sausage material and is not strictly scientific in the sense in which it is used. Coagulation as it is used in this specification refers to the step involving hardening and stabilization of the casing. This is principally achieved in two ways: firstly by removal of water from the collagen gel; and secondly by cross-linking the collagen fibers.

It is known in the art to use concentrated salt solutions for coagulation of collagen gel in coextrusion processes. Conventional salt solutions typically use sodium chloride. As set forth above, however, the use of sodium chloride-containing coagulation baths present many problems.

This invention is the first to use a highly dissoluble salt for coagulation of collagen gel in the coextrusion process in combination with an inorganically acidified collagen casing gel, having a dry matter of between 3 and 25%. The highly dissoluble salt provides higher osmotic drying of the collagen gel, thus shortening the coagulation time of the gel. The highly dissoluble salt also allows the temperature of the coagulation to be lowered. The highly dissoluble salt therefore offers many advantages over conventional coagulation methods, particularly when being used in combination of a inorganically acidified collagen containing gel having a dry matter of between 3 and 25%.

First, the shorter coagulation time shortens the exposure of the meat or other food product to the salt solution. Thus, there is less migration of the salt solution into the meat, thereby eliminating the off-taste typically produced using sodium chloride. Since the coagulation bath temperature may be lowered, ambient (meat locker) temperatures may be used in the process, which prevents the meat discoloration often associated with exposure to higher temperatures. The shorter coagulation time thereby provides cost savings by removing the need for coagulation temperature control, allowing the use of a smaller coagulation bath (or a shorter transporting belt), and further provides savings on the usage of salt and energy.

Further, use of the highly dissoluble salt in the coagulation step sufficiently reduces the water content of the casing such that the air drying step, which is normally necessary to further reduce the water content of the casing to an acceptable level, is no longer necessary. The removal of this expensive and time consuming air drying step reduces the cost of the coextrusion process significantly. Air drying is the most usual form of drying employed in conventional coextrusion processes and it is the main feature which limits the speed of the process. Thus, the present invention not only provides a product which can be directly handled and/or hung but which is also much cheaper to operate than known coextrusion processes.

Even without the air drying step, the manufactured casing has sufficient strength to allow mechanical separation of the product into individual food stuff elements which are connected to each other. It is therefore possible to prepare fresh, smoked or cooked edible food stuffs of which the properties are equal to those of known edible food stuffs which have been manufactured in a natural or edible or non edible artificial casing.

Highly dissoluble salts which may be used in the instant invention have a dissolubility at 20° C. of at least 8 moles per liter water. Highly dissoluble salts which can be used must be food approved. The most preferred salts are potassium phosphate and potassium carbonate, because of their high dissolvability and lack of taste.

The highly dissoluble salt is used in an aqueous coagulation solution. It should be present in an amount of between about 25 and 200% w/v. The preferred concentration of salt is between about 80 and 100% w/v. The concentrated salt solution in accordance with the present invention provides for coagulation of the outer surface of a food strand in less than 60 seconds. The preferred coagulation bath has a pH in the range of 7 to 14, and preferably 8 to 9 and a temperature of between 0° C. and 20° C., preferably 4 to 7° C. The coagulation solution may contain a combination of highly dissolvable salts, or other additives such as salts, crosslinking agents, plasticizers, colorants or other functional ingredients.

The gel used in this invention contains collagen. The collagen is derived from suitable animal sources known in the art of collagen film making such as bovine hides or pork skin or pork serosa. The collagen in raw material is extracted in a pure fibrillar form necessary to achieve the desired result. There are many known methods for obtaining suitable fibrillar collagen, all of which can be used successfully in combination with this invention. The fibrillar collagen is brought in suspension with water and acidified such as to allow the collagen to swell i.e. bind the water, and allow the suspension to set as a gel. Virtually any food approved acid is suitable to swell the collagen. However, surprisingly it was found that in combination of a coagulation method using a highly dissolvable salt, it is beneficial to use an inorganic acid such as hydrochloric or sulfuric acid, as opposed to organic acids such as lactic or acidic acid. The inorganizally swollen gel may contain other functional ingredients such as organic acids, colorants crosslinking agents, fillers such as cellulose fibers, plasticisers such as glycerol etc. The combined dry matter of the gel i.e. collagen and other functional ingredients, is between 3 and 25%. The collagen dry matter content is preferably 2–15%, more preferably 3–8%. Combined dry matter is most preferably between 4 and 10%. In all possibilities the balance of the gel containing water. If a crosslinking agent is added it will comprise about 0.1–5% of the gel.

In operation, the coextruding apparatus will have two separate pumps, one for the meat emulsion and one for the collagen gel. The coextruder may be of a design known in the art, such as a conical extruder or a contra-rotating disc extruder. Optionally, liquid smoke or other cross-linking agent will be delivered to the collagen gel prior to coextrusion. Preferably the liquid smoke is inserted into the gel stream prior to extrusion between the gel pump and extruder apparatus. Other functional ingredients such as coloring agents may also be included in the casing, for example, within a crosslinking agent injected into the gel prior to extrusion. Alternatively, the functional ingredient may be injected independently into the gel prior to extrusion thereof.

A strand of meat emulsion or other foodstuff and the collagen are coextruded from their respective pumps such that the collagen gel material is on the outer surface of the emulsion. Usually, the amount of collagen containing gel coextruded around the edible product is 3 to 10% of the total weight of gel and food product. Preferably, the finished coagulated collagen gel casing has a thickness of about 10 to 50 microns. The thickness is generally in proportion to the diameter of the food strand.

The materials may be coextruded onto a moving conveyor belt wherein the moving coated sausage can be sprayed with a quantity of coagulation solution or passed through a coagulation treatment bath. When using a highly concentrated salt solution in a treatment bath where the extruded sausage strand is allowed to float in said bath, it may be beneficial to provide means to submerse the entire sausage surface in the coagulation solution. Hereby preventing uneven coagulation of the sausage surface when due to the high ionic content of the brine, without such means the top of the strand is not coagulated well enough, or at least not equally to the immersed bottom section. If a bath is used, it will normally comprise a shallow trough having a conveyor therein to enable the coagulation solution to freely contact the coextruded collagen coating. If a spraying system is used, it will preferably include a means for rotating the sausage strand lengthwise to better permit the coagulation solution to contact all of the outer surface of the food strand. Other treatment solutions can be applied to the food strand concurrently or following the initial coagulation step.

The conveyor belt speed is controlled with a computer or other means so that the food strand will be in contact with the coagulation solution for an amount of time sufficient to coagulate the outer surface. As set forth above, with the highly dissoluble salt solution, this period of time is less than 60 seconds. Once the outer surface of the food strand is sufficiently coagulated, no further air drying step is necessary. The food strand is discharged to a suitable collection receptacle where it can then be formed into a plurality of lengths at that location if desired using means well known to those of ordinary skill in the art. The excess brine on the food strand after coagulation is preferably removed prior to or after separation into links. The removal can be accomplished for instance by rinsing with water or another fluid such as ethanol. Or might be accomplished my mechanical means such as scraping or forced air blowing.

A preferred embodiment of the invention will now be described by way of example only in conjunction with FIGS. 1–3. It is not intended to limit the scope of the instant invention in any manner.

EXAMPLE 1

Production of Coextruded Sausages

FIGS. 1 and 2 generally set forth a coextruding machine which the coagulation solution and the preferred collagen containing gel of the instant invention may be used. The numeral 10 designates a coextruding machine and conveyor. The numeral 12 is a meat emulsion hopper using a meat pump machine for pumping emulsified meat. A collagen gel pump 16 has a hopper 18 for receiving the collagen gel. It is connected by a conduit 19 to inline mixer 20. A tube connects the inline mixer 20 to the coextruder 24 which is capable of extruding a cylindrical strand of meat emulsion with a collagen gel material on the outer surface thereof. Coextruder 24 is connected by tube 25 to the meat pump 14. The conventional coextruded strand of sausage 26 (FIG. 3) has an emulsified meat material core 27 with the collagen gel comprising the outer surface 28 thereof. Liquid smoke from liquid smoke dispenser 30 may be used as a coagulation material to coagulate the other surface 28 of sausage strand 26. The liquid smoke dispenser 30 can be connected in any convenient way such as by line 32 to the inline mixer 20 (FIG. 1).

A conveyor 34 is mounted on frame 36 and has a point of beginning 38 adjacent the output end of coextruder 24, and a discharge station 40 which is located outwardly and downwardly from the point of beginning 38. Three sprockets 42 are rotatably mounted on frame 36 and are adapted to rotate about a horizontal axis. As best shown in FIG. 2, two of the sprockets 42 are vertically disposed with respect to each other below point of beginning 38, and the third sprocket 42 is located on the outer end of a conveyor adjacent discharge station 40.

Two vertical shafts 44 are mounted on opposite ends of frame 36. Each shaft 42 has five rotatably disposed sprockets 46 thereon which are adapted to rotate on shafts 44 about the vertical axis of the shafts. Each set of five sprockets 46 are located in the same parallel plane as one each of the sprockets on the opposite vertical shaft 44. An endless conveyor belt 48 is circuitiously mounted on the sprockets 42 and 46. An infrared heater 50 is mounted on frame 36 adjacent discharge station 40. A drive 51 for the conveyor belt 48 is located adjacent the discharge station 40 as best shown in FIGS. 1 and 2.

Belt 48 (FIG. 3) is disposed between a plurality of elongated L-shaped guides 54 which are secured to frame 36. Elongated rails 56 mounted on bearings 58 extend longitudinally through the guides.

With reference to FIG. 2, a brine circuit system 74 includes a brine pump 76. A plurality of miscellaneous control valves 78 are imposed in the brine circuit 74 to selectively control the flow of brine through the system. A fluid line 80 extends from pump 76 and includes a plurality of spaced nozzles 82 which are located in a plurality of locations on frame 36 directly above the conveyor belt 48 (see FIG. 3) to dispense a spray of coagulation solution on the strand of sausage 36.

Brine circuit 74 includes a brine tank 84 which is connected to a brine collection tray 86 located below the various tiers of conveyor belt 48.

As set forth above, the present invention discloses a method and means for using a coagulation solution containing a highly dissoluble salt to produce a coextruded food product with better strength, taste and appearance than food products manufactured with conventional coextrusion processes. Further, the use of the highly dissoluble salt results in additional cost savings due to the simpler coextrusion process, i.e. no air drying step or temperature control, as well as savings on the usage of salt and energy consumption. Using inorganically acidified collagen-containing gel having a dry matter of between 3 and 25% in combination with high ionic coagulation fluid gives an unprecedented high strength co-extruded casing.

It is therefore seen that the present invention achieves at least all of its stated objectives.

What is claimed is:

1. A process for coagulating the outer surface of a coextruded food product comprising:

coextruding a strand of food material to create a substantially uniform layer of a collagen-containing gel around an inner core of food material, acidifying said collagen-containing gel using an inorganic acid;

coating the strand with a coagulation solution to create a coated strand, said coagulating solution comprising a highly dissoluble salt selected from the group consisting of potassium carbonate and dipotassium phosphate;

the highly dissoluble salt having a dissolution rate of at least 8 moles per liter of water at 20° C.;

allowing the coated strand to coagulate.

2. A process according to claim 1 wherein the coated strand is not subjected to an air drying step following the coating step.

3. A process according to claim 1 wherein the process is performed at ambient temperature.

4. A process according to claim 1 wherein the coagulation step is performed in 60 seconds or less.

5. A process according to claim 1 wherein the coagulation solution is applied by passing the food strand through a bath containing the coagulation solution.

6. A process according to claim 1 wherein the coagulation solution is sprayed onto the food strand.

7. A process according to claim 1 wherein said inorganic acid is selected from the group consisting of hydrochloric acid and sulfuric acid.

8. The process of claim 1 wherein the collagen-containing gel has a dry matter of between 3% and 25%.

9. A process for coagulating the outer surface of a coextruded food product comprising:

coextruding a strand of food material to create a substantially uniform layer of a collagen-containing gel around an inner core of food material, wherein the collagen gel layer has a dry matter of 3% to 25%;

coating the strand with a coagulation solution to create a coated strand, said coagulation solution consisting essentially of a highly dissolvable salt selected from the group consisting of potassium carbonate and dipotassium phosphate;

the highly dissoluble salt having a dissolution rate of at least 8 moles per liter of water at 20° C.;

allowing the coated strand to coagulate.

10. A process for coagulating the outer surface of a coextruded food product comprising:

coextruding a strand of food material to create a substantially uniform layer of a collagen-containing gel around an inner core of food material, acidifying said collagen-containing gel using an inorganic acid;

coating the strand with a coagulation solution to create a coated strand, said coagulation solution comprising a highly dissoluble salt;

the highly dissoluble salt is selected from the group consisting of dipotassium phosphate and potassium carbonate;

allowing the coated strand to coagulate.

11. A process for coagulating the outer surface of a coextruded food product comprising:

coextruding a strand of food material to create a substantially uniform layer of a collagen-containing gel around an inner core of food material, wherein the collagen gel layer has a dry matter of 3% to 25%;

coating the strand with a coagulation solution to create a coated strand, said coagulation solution consisting essentially of dipotassium phosphate;

allowing the coated strand to coagulate.

12. A process for coagulating the outer surface of a coextruded food product comprising:

coextruding a strand of food material to create a substantially uniform layer of a collagen-containing gel around an inner core of food material, wherein the collagen gel layer has a dry matter of 3% to 25%;

coating the strand with a coagulation solution to create a coated strand, said coagulation solution consisting essentially of dipotassium phosphate;

said dipotassium phosphate having a dissolution rate of at least 8 moles per liter of water at 20° C.

13. A process for coagulating the outer surface of a coextruded food product comprising:

coextruding a strand of food material to create a substantially uniform layer of a collagen-containing gel around an inner core of food material, acidifying said collagen-containing gel using an inorganic acid;

coating the strand with a coagulation solution to create a coated strand, said coagulation solution consisting essentially of dipotassium phosphate;

said dipotassium phosphate having a dissolution rate of at least 8 moles per liter of water at 20° C.;

allowing the coated strand to coagulate.

* * * * *